United States Patent
Bouchard et al.

(10) Patent No.: US 6,457,578 B2
(45) Date of Patent: Oct. 1, 2002

(54) RECIPROCATING SLAT FLOOR CONVEYOR

(76) Inventors: Jean-Guy Y. Bouchard, 129 rue Principal, Macamic, Quebec (CA), J0Z 2S0; Laurent J. Y. Trudel, 486 rue du Parc, La Sarre Quebec (CA), J9Z 2E7; Joseph A. P. Robitaille, 54 avenue Gagnon, La Sarre (CA), J9Z 2P1

( * ) Notice: Subject to any disclaimer, the term of this patent is extended or adjusted under 35 U.S.C. 154(b) by 0 days.

(21) Appl. No.: 09/845,400

(22) Filed: Apr. 30, 2001

(51) Int. Cl.[7] .................. B65G 25/04; B65G 25/00; B60P 1/00; B65F 3/00

(52) U.S. Cl. ................ 198/750.5; 198/750.4; 198/773; 414/525.1

(58) Field of Search .............. 198/750.1, 750.5, 198/750.4, 773, 775, 774.1, 774.4; 414/525.1

(56) References Cited

U.S. PATENT DOCUMENTS

| | | | | |
|---|---|---|---|---|
| 4,679,686 A | * | 7/1987 | Foster | 198/750.4 |
| 4,899,870 A | * | 2/1990 | Foster | 198/750.2 |
| 4,962,848 A | * | 10/1990 | Foster | 198/750.2 |
| 4,966,275 A | * | 10/1990 | Hallstrom, Jr. | 198/750.6 |
| 5,340,264 A | * | 8/1994 | Quaeck | 198/770.5 |
| 5,588,522 A | * | 12/1996 | Foster et al. | 198/775 |

* cited by examiner

*Primary Examiner*—Christopher P. Ellis
*Assistant Examiner*—Gene O. Crawford
(74) *Attorney, Agent, or Firm*—Stanley E Johnson

(57) ABSTRACT

A moving slat conveyor in which the slats are reciprocally mounted on cross beams and wherein the slats are provided with depressed areas above the respective beams so that the slats fall and rise during their reciprocal movement. All of the slats are moved in unison to carry the goods thereon to an advanced position and in sequence groups of slats are retuned to their home position. During the return the slats lower whereby their upper surface is below the plane of the remaining slats that are supporting the goods.

9 Claims, 4 Drawing Sheets

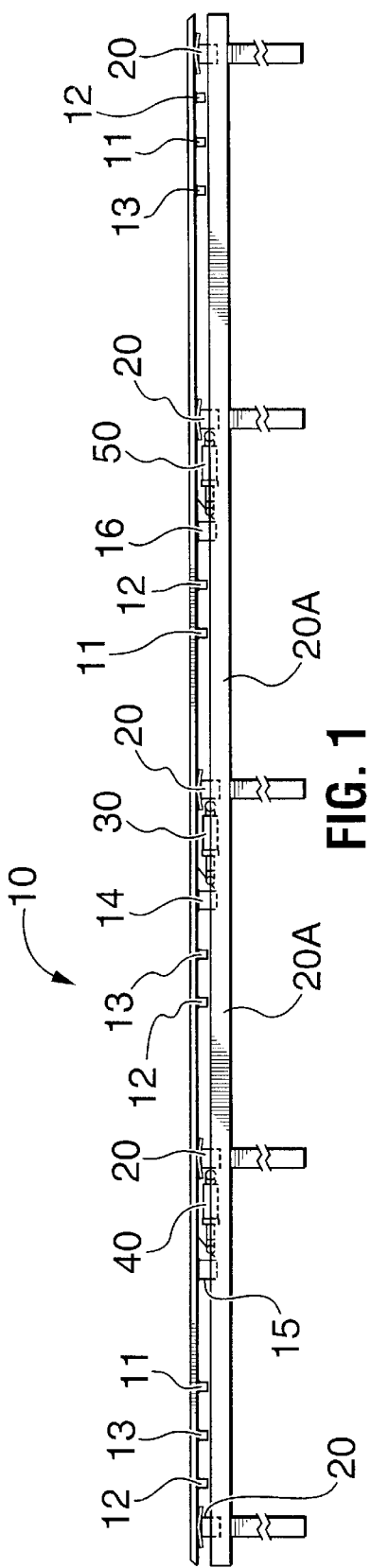
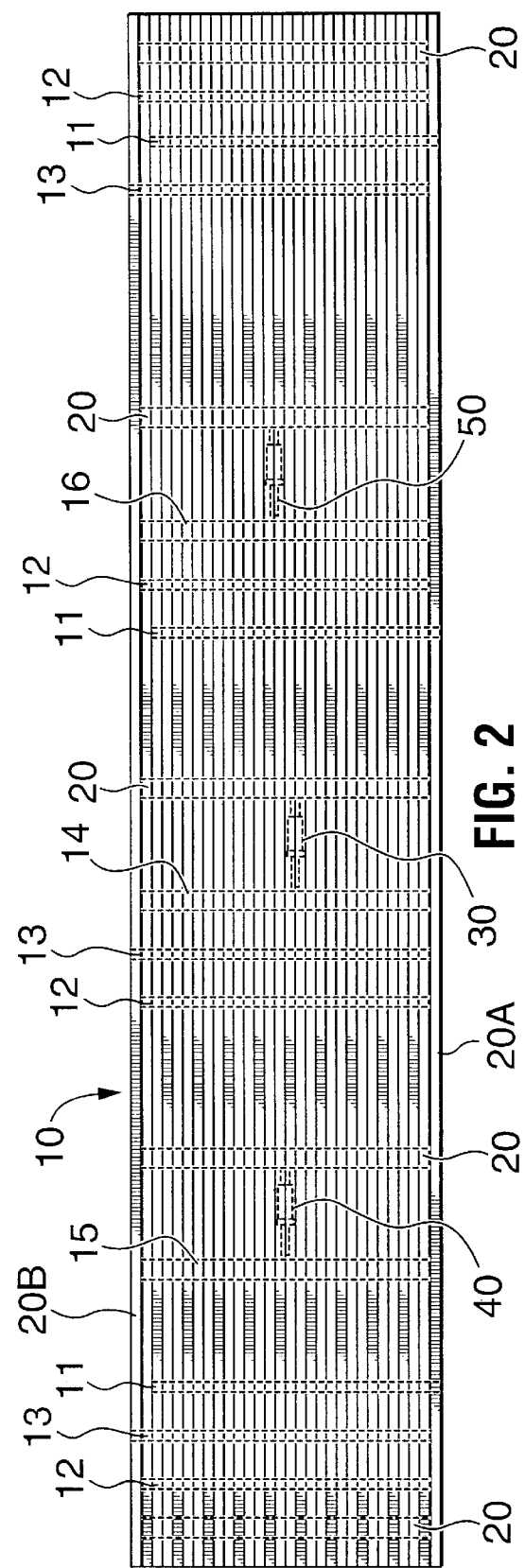

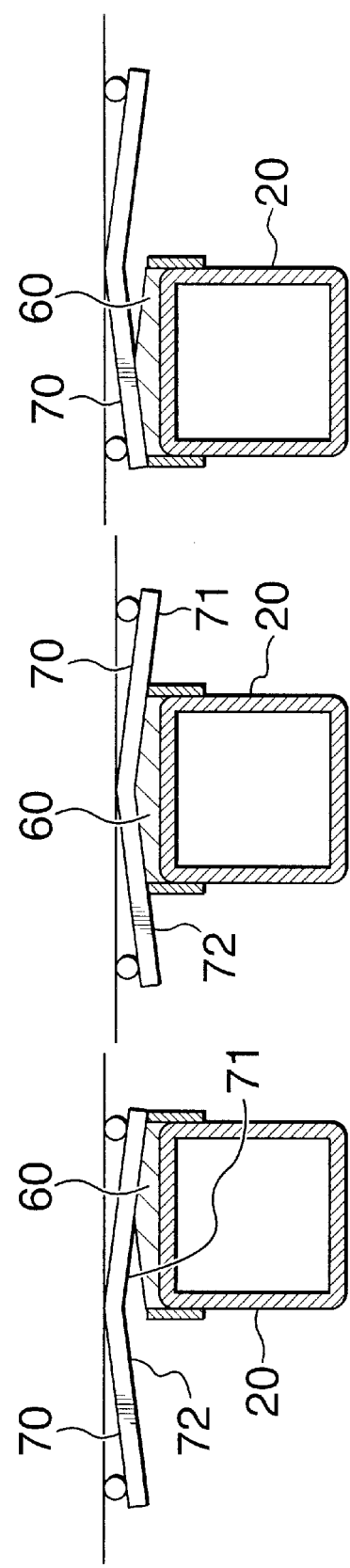

RECIPROCATING SLAT FLOOR CONVEYOR

FIELD OF INVENTION

This invention relates generally to reciprocating floor conveyors and more particularly to an improvement thereto comprising raising and lowering the slats as they move horizontally.

BACKGROUND OF INVENTION

Reciprocating floor conveyors are used in bins, in trailers and on docks for loading and unloading goods. These conveyors typically constitute the floor of the cargo container, or the deck of a loading dock, as the case may be, and comprise a plurality of slats disposed in side-by-side horizontal relation on a support structure. The slats for example in a bin or trailer body may be two inch high by three inch wide tubular or channel metal members of suitable thickness and extend the length of the cargo container. The slats are slidably mounted on a support structure and are reciprocated back and forth in the same plane by a suitable drive system or mechanism to convey materials resting on the slats.

The floor slats are commonly divided into three (or more) slat groups with every third slat being in a common group. To move the goods all slats are moved in unison about nine inches in one direction and then the slats are returned one group at a time to their initial i.e. home position. The goods remain in the advanced position while the respective groups of slats are returned to their home position. Since conveying of the goods is dependent upon frictional contact success can only be attained if the frictional forces on one third of the slats is low enough for the goods to remain in the advanced position on the two thirds of the slats while the slats are returned to their home position one group at a time. In some instances the goods will move back and forth with the slats and thus there is little or no advancement of the goods even though only one third of the slats are returned at a time to their home position. This can be caused by the goods themselves ie physical characteristics such as a bunch of wood pieces of various sizes and/or length and/or due to deflection of some of the slats relative to the other adjacently disposed slats because of the load distribution of the goods thereon.

There are a number of issued patents directed to various features of reciprocating floor conveyors and by way of example and for further information reference may be had to the following:

Foster et al U.S. Pat. No. 5,588,522 issued Dec. 31, 1996
Foster U.S. Pat. No. 5,355,995 Issued Oct. 18, 1994
Hallstrom Jr U.S. Pat. No. 4,966,275 Issued Oct. 30, 1990
Foster U.S. Pat. No. 5,433,312 Issued Jul. 18, 1995
Howe Jr U.S. Pat. No. 4,286,422 Issued Sep. 1, 1981
Foster U.S. Pat. No. 5,911,555 Issued Jun. 15, 1999
Lutz U.S. Pat. No. 5,522,494 Issued Jun. 4, 1996
Quaeck U.S. Pat. No. 5,799,778 Issued Sep. 1, 1998
Foster U.S. Pat. No. 4,907,691 Issued Mar. 13, 1990

SUMMARY OF INVENTION

A principal object of the present invention is to reduce frictional contact of the goods with the slats that are returning to their home position while they are returning to their home position.

In keeping with the forgoing there is provided in accordance with the present invention means mounting the slats, in a moving floor conveyor, in such a manner that on their return to their home position their upper load engaging surface is below the plane of the remaining slats that are in their advanced and retracted positions and supporting the goods they have carried to that advanced position.

LIST OF DRAWINGS

The invention is illustrated, by way of example, in the accompanying drawings wherein:

FIG. 1 is a side elevation view of a moving floor conveyor of the present invention;

FIG. 2 is a bottom view of the floor in FIG. 1;

FIG. 2a is a bottom view of the floor portion shown in FIG. 1a;

FIG. 3 is an end elevation view taken essentially along line 3—3 in FIG. 1a;

FIGS. 4, 5 and 6 illustrate on a larger scale one of the many slide bearing blocks and slide plates that cause the slats to raise and lower as they are reciprocated back and forth and in which;

FIG. 4 is a side elevation view of a slide plate that is secured rigidly to the under side of a slat that is shown in broken line;

FIG. 5 is a top plan view of the plate shown in FIG. 4; and

FIG. 6 is an end elevation view, in part section, of a bearing block mounted atop a cross beam; and FIGS. 7, 8 and 9 are side elevation views illustrating a slat respectively at a partially retracted, mid-stroke and partially advanced position.

DETAILED DESCRIPTION OF PREFERRED EMBODIMENT

Figure 1A:
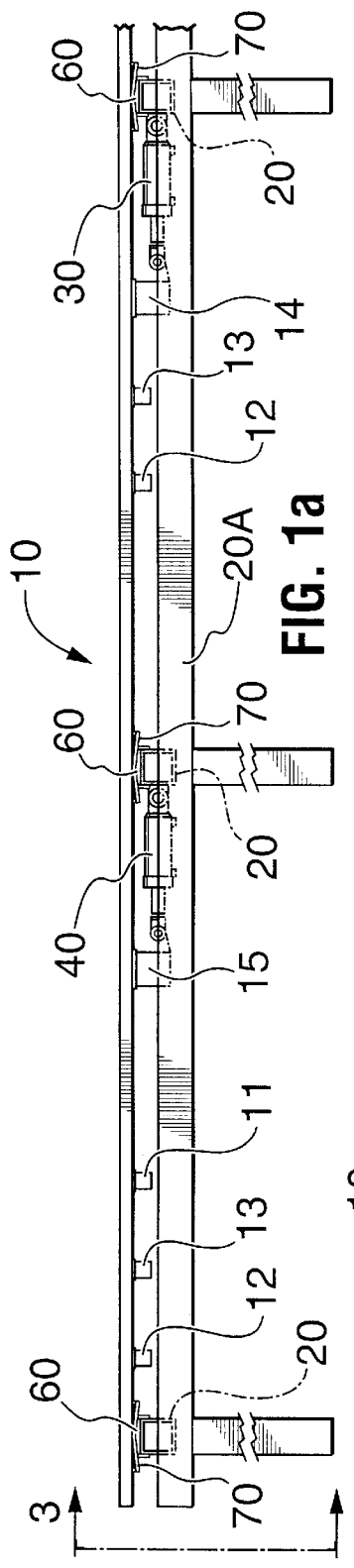
FIG. 1a is similar to FIG. 1 but on a larger scale and illustrating only a portion of the length of the floor.

Referring to the drawings there is illustrated a floor 10 comprising a plurality of longitudinally extending slats disposed in side-by-side parallel relation and supported on a plurality of horizontally spaced apart cross beams 20. The crossbeams 20 are supported at their respective opposite ends by longitudinally extending beams 20A and 20B that are part of or carried by a suitable rigid structure. The slats slide on the cross beams 20 during their reciprocal movement and in accordance with the present invention, a depression i.e. concave area is created on the bottom side of the slats at locations where they rest on the crossbeams and these cause the slats to rise and fall as they reciprocate back and forth on the crossbeams.

The slats are tubular metal members 3 inches wide by 2 inches deep (but may be channels if desired) and have a wall thickness of $3/16$ of an inch. The cross beams are at a spacing of 9 feet 6 inches. The floor constitutes the bottom of a bin 8 feet wide, 8 feet high (side walls have been omitted for clarity of illustration) and 40 to 60 feet long and designed by applicants specifically for holding a supply of wood blocks and dispensing the same therefrom by the moving floor to an infeed conveyor of a finger jointer wood processing system. These dimensions and specific use are by way of example only and can be readily modified to suit the task and meet the requirements at hand.

Applicants discovered a conventional reciprocating slat floor conveyor would not advance the wood blocks. The blocks would do nothing more than move back and forth with the slats. Applicants solved this problem by causing the slats to lower from their load support position as they returned from their advanced position to their retracted at home position. This reduces or even eliminates frictional forces on the goods during retraction of the slats to their home position thus ensuring the goods remain at the advanced position while the groups of slats are retracted in sequence.

Figure 2A:
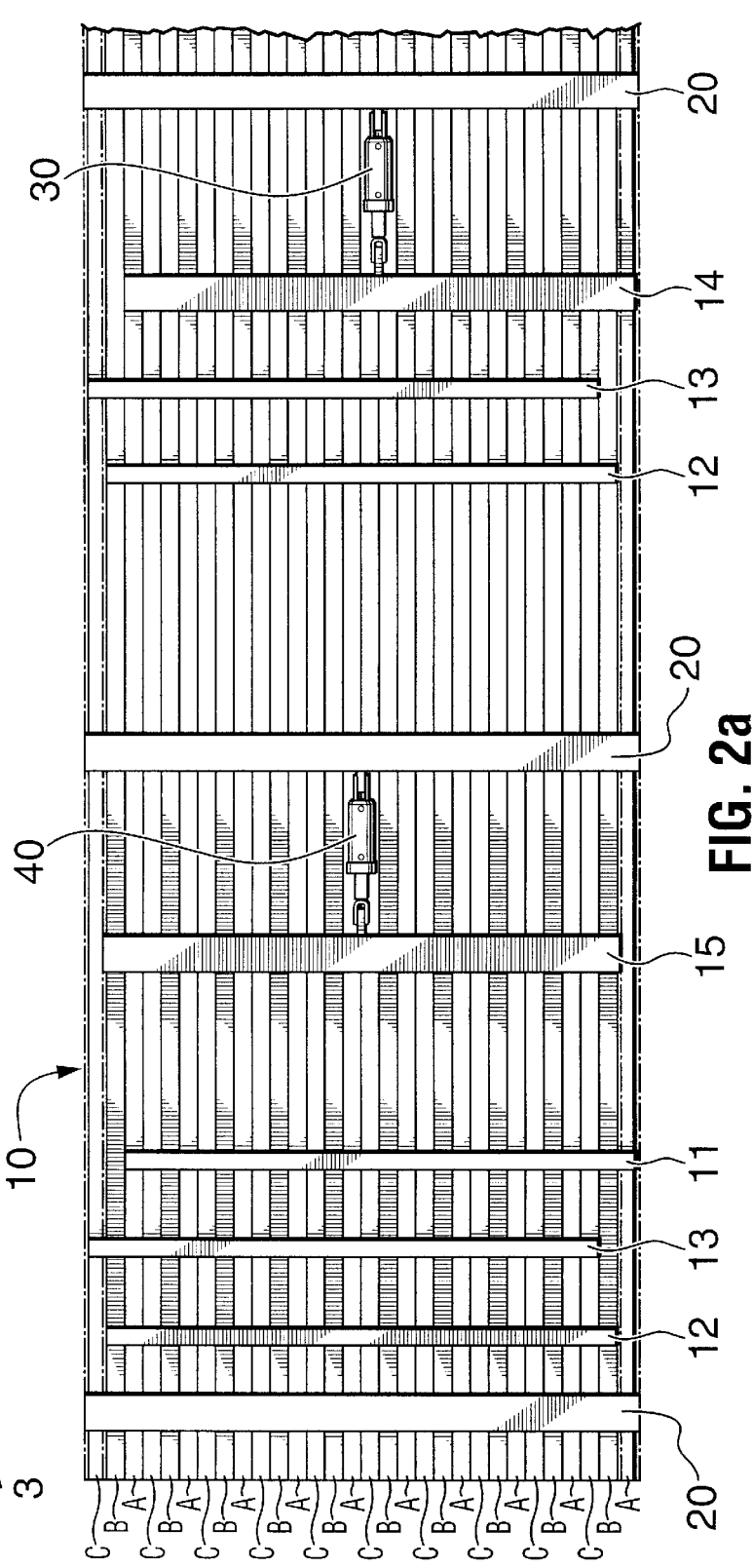
Figure 3:
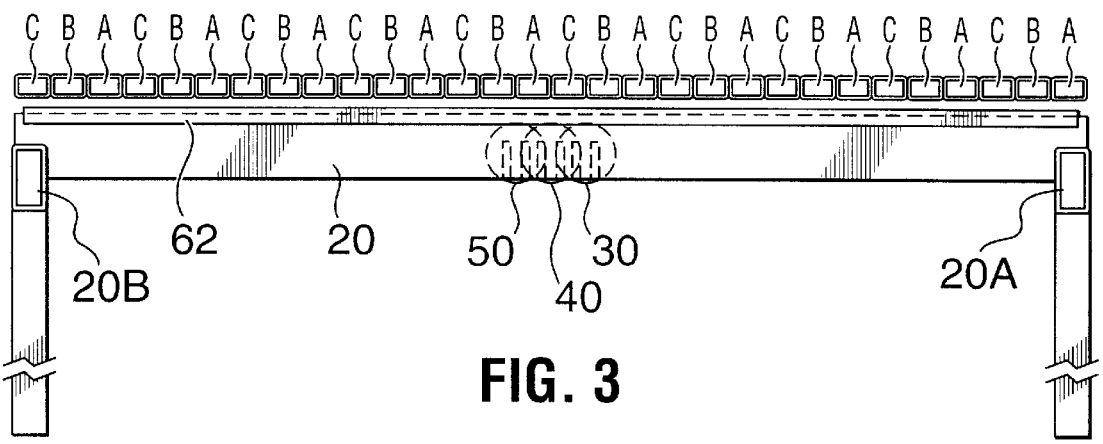

The slats 10 are subdivided into three groups. The slats in the respective groups are designated A, B and C (see FIGS. 2a and 3). All slats A are rigidly attached as for example by welding to cross members 11, slats B are secured to cross members 12 and slats C are secured to cross members 13. The slats A are also rigidly secured to a further more substantial cross member 14 and slats B and C to respective further substantial cross members 15 and 16.

Figure 6:
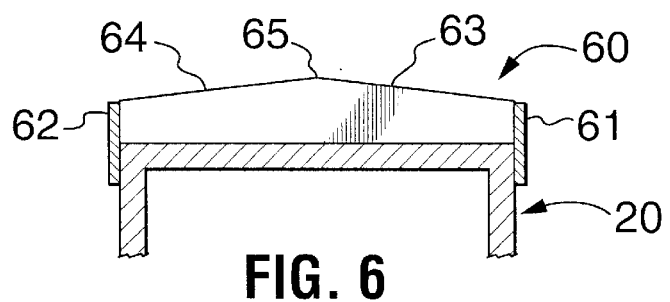

The slat drive system comprises three pneumatic (or hydraulic) double acting cylinder units designated respectively 30, 40 and 50. These cylinder units are anchored at one end to an adjacent one of the cross beams 20 of the rigid support structure (or some other suitable fixed in position anchor point) and at the opposite end to the respective one of the slat cross members 14, 15 and 16 associated therewith. Cylinder unit 30, when actuated, reciprocates all of the A slats, cylinder unit 40 similarly reciprocates all B slats and cylinder unit 50 reciprocates all C slats. By actuating the cylinder units 30, 40 and 50 in sequence the groups of slats A, B and C are returned to their home position one group at a time. By actuating all cylinder units at the same time all slats are moved in unison in one direction or the other from an at home rest position to an advanced position moving the goods thereon in that direction. The controls are such that the goods can be moved in either direction ie to unload or load the goods Each cross beam 20 has a slide bearing block 60 on the upper surface thereof. Each bearing block is a longitudinal strip of friction reducing, long wearing, material such as nylon or Teflon or a suitable backing material with a coating of nylon or Teflon on the upper surface thereof. Referring to FIG. 6 it will be seen that the bearing block 60 rests on the upper surface of the crossbeam and is retained in position by a pair of straps 61 and 62. The straps are secured to respective opposite faces of the crossbeam and project upwardly beyond the upper face of the crossbeam captively retaining the strip in position.

The bearing block has an upper surface comprising two planar surfaces 63 and 64 that slope upwardly in opposite directions meeting at an apex 65 the rise being about three eighths of an inch with the strip width being about 6 inches. The apex is mid-width of the strip and the depth from the apex to the bottom of the strip is approximately 1 inch. There is a bearing block 60 on each crossbeam 20 and these bearing blocks extend across the full width of the floor.

Figure 4:
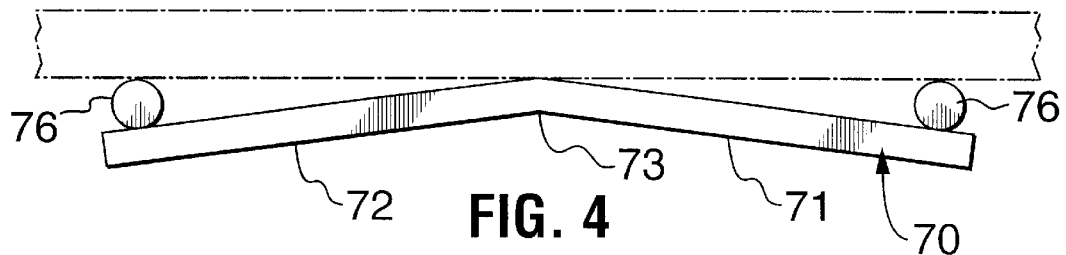
Figure 5:
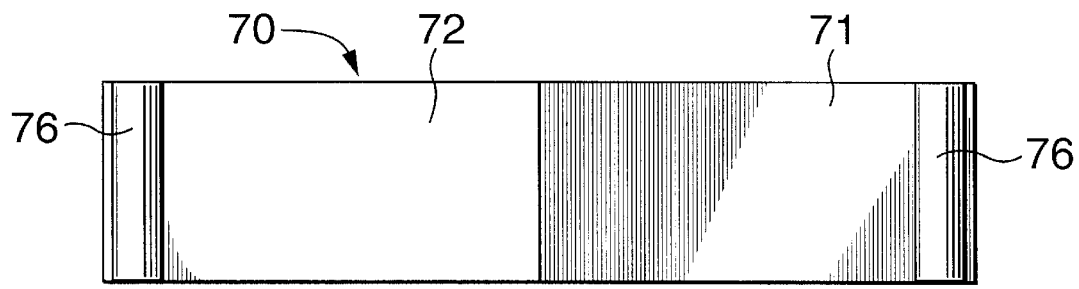

On the underside of each slat and rigidly secured thereto is a slide plate 70 at a position above each of the respective crossbeams 20. Each slide plate (see FIGS. 4 & 5) is a metal bar 3 inches wide and 13 inches long with the length disposed transverse to the lengthwise direction of the cross beam associated therewith. The metal bar is bent mid-length providing respective sloped slide surfaces 71 and 72 on its bottom face. The sloped faces meet at a crest 73. On the top face of the slide plate are two spaced apart spacer rods 76 that abut against the slat. The slide plate faces 71 and 72 ride on the bearing block faces 63 and 64 (or apex 65 if the angle of the sloping faces don't match) during reciprocal movement of the slats. The bent slide plate effectively creates a depression i.e. concave area extending longitudinally of the slat and have sloping surfaces. The sloping faces of the depressions, riding on the crossbeams, cause the slats to move in a vertical direction as they are moved back and forth in a horizontal direction. The upper surfaces of the slats are in a raised position, at each of the slats retracted and advanced travel positions, relative to when the slats are at some point of travel therebetween.

FIGS. 7, 8 and 9 illustrate a slat respectively in a retracted, a mid-stroke and an advanced position. In the retracted ie home position the slats are in a raised position and as they advance in unison they lower gradually to their lowest position at mid-stroke (or at some selected point of travel between the advanced and retracted positions) and then rise gradually to their high position at their final advanced position. The goods on the floor remains at this advanced position while the slats are returned to their home position one group at a time in sequence. The slats as they return from their advanced to their retraced home position first lower from a raised position to their lowest position and then gradually return to their raised position. The upper surface of the returning slats thus are at a lower elevation than the plane at which the goods are supported by the remaining slats until they reach their retracted home position. The returning slats are thus out of contact with the goods being conveyed and therefore not only will the goods remain at the advanced position but also less power is required to return the slats to their home position. In some installations the number of groups of slats can be reduced from three to two with a corresponding reduction in the drive system or mechanism.

The surfaces 71 and 72 of the slide plate are effectively respective faces of two wedges disposed in toe-to-toe relation and move with the slat. Wedges could readily be secured to the slat and replace the slide plate 60 and such wedges or slide plate could if desired ride directly on the upper edges of the crossbeam if wear was of little concern or on replaceable wear pads attached to the crossbeam if wear is of concern. In the disclosed embodiment the apex 65 of member 60 could readily be replaced by a series of rollers (or spheres) either on the member 60 or directly on the crossbeam 20. Instead of a series of rollers (or spheres) a single roller that extends along the length of the crossbeam associated therewith could be used any of which alternative constructions would reduce the force required to oscillate the slats.

In the embodiment illustrated separate pieces in the form of bent bars (or wedges) are attached to the under side of the slates to in effect create depressions i.e. concave areas that cause the slats to rise and fall while they reciprocate back and forth. Rather than add pieces to create the depressions actual depressions could be created in the bottom side of the slats, at appropriate locations above the respective crossbeams 20, to cause the same raising and lowering effect.

The wear resistant material could be on the slat instead of the beam and the amount of rise and fall and the length of travel may be varied to suit and/or meet the requirements of an installation at hand. The depressions i.e. concave areas are tapered to provide a gradual fall, and rise as the case maybe, as the slats are reciprocated. They are effectively cam surfaces that can be shaped to provide whatever motion maybe required, or desired, for the installation at hand.

We claim:

1. A reciprocating slat horizontal conveyor comprising a plurality of side-by-side slats reciprocally mounted on a plurality of horizontally spaced apart cross beams of a rigid support structure, a depressed area of selected length on the under side of the respective slats, above each of said cross beams associated, each said depressed area gradually increasing to a selected depth and then gradually decreasing in depth in a direction lengthwise of the slat whereby upon reciprocation of the slats on the crossbeams said slats move up and down an amount corresponding to said selected depth.

2. A conveyor as defined in claim 1 wherein said depressed areas are provided by members attached to the underside of the slats.

3. A conveyor as defined in claim 1 wherein said depressed areas are formed in the underside surface of the slats.

4. A conveyor as defined in claim 1 including a friction reducing wear resistant material interposed between said crossbeams and said slats.

5. A conveyor as defined in claim 1 wherein the slats, during reciprocal movement, travel a selected distance from one to the other of a first at home position and a second advanced position and wherein the upper surface of the slats are in a common plane in each of said first and second positions of travel and at some location below said common plane when the slats are at a travel location between said first and second positions.

6. A conveyor as defined in claim 5 wherein said selected distance is approximately 9 inches.

7. A conveyor as defined in claim 1 including drive means connected to said slats and said support structure and operative to reciprocate said slats back and forth in a direction lengthwise of the slats.

8. A conveyor as defined in claim 7 wherein said slats, during reciprocation, are moved from one to the other of a first retracted at home position, and a second advanced position and wherein said drive and beam engaging depressed areas are coordinated such that during reciprocation said slats are in a raised position at each of said first and second slat positions of travel and at their lower position at some slat travel position there between.

9. A conveyor as defined in claim 8 wherein said slats are interconnected in groups with a selected number of slats in each group and wherein said drive means returns the groups of slats in sequence from their advanced to their home position.

* * * * *